United States Patent
Cohen et al.

[15] 3,670,083

[45] June 13, 1972

[54] GERMINE-DIACETATE IN THE TREATMENT OF MYASTHENIA GRAVIS

[72] Inventors: Edward M. Cohen, Norristown, Pa.; Edward J. J. Grabowski, Westfield, N.J.; Rezso Aczel, Chalfont, Pa.

[73] Assignee: Merck & Co., Inc., Rahway, N.J.

[22] Filed: Feb. 6, 1970

[21] Appl. No.: 9,439

[52] U.S. Cl. ................................................424/256, 260/287
[51] Int. Cl. .........................................................A61k 27/00
[58] Field of Search..................................424/256; 260/287

[56] References Cited

OTHER PUBLICATIONS

Chem. Abst. 68–94464h, (1968).

*Primary Examiner*—Stanley J. Friedman
*Attorney*—Thomas E. Arther, Harry E. Westlake, Jr. and I. Louis Wolk

[57] ABSTRACT

Germine-3,15-diacetate is prepared by transesterification of germine-3,16-diacetate. This novel compound has been found to be useful in the treatment of myasthenia.

2 Claims, No Drawings

GERMINE-DIACETATE IN THE TREATMENT OF MYASTHENIA GRAVIS

SUMMARY OF THE INVENTION

This invention relates to the preparation of a new germine-diacetate. More particularly, it relates to the preparation of germine-3,15-diacetate by the transesterification of germine-3,16-diacetate and to salts and hydrates thereof. Germine-3,15-diacetate has valuable pharmacological properties which provide effective alleviation of skeletal muscle weakness in patients with myasthenia gravis.

BACKGROUND OF THE INVENTION

The disease known as myasthenia gravis is one which affects a substantial portion of the population and is characterized by fatigue and exhaustion of the muscular system marked by progressive paralysis of muscles without sensory disturbances or atrophy. It may affect any muscle of the body but especially those of the face, lips, tongue, throat and neck. One of the methods used in the past for the treatment of or the alleviation of the symptoms of this disease is the administration of drugs in an attempt to reverse at least temporarily some of the wasting affects of the disease. Included among the drugs administered was a mixture of veratrum alkaloids. This particular mixture, although it appeared to have some salutary effect, could only be used to a limited extent because of the variety of side effects attendant on the administration of the medication.

The compound germine-3,15-diacetate is effective in alleviating skeletal muscle weakness in patients with myasthenia gravis without having the attendant side effects occasioned by the administration of the veratrum alkaloids.

One might suspect that an ideal manner of preparing germine-3,15-diacetate would be by the direct acetylation of the germine itself [S. Morris Kupchan and C. R. Narazanon, J.A.C.S., 81:1913-21 (1959)]. Germine is a complicated polycyclic molecule containing one hetero atom and seven hydroxyl substituents, four of which are readily acylable. The selective acetylation of the 3- and the 15-positions is a virtual impossibility without blocking some of the more readily acylable positions.

We have found that germine-3,15-diacetate can be conveniently prepared by a transesterification of germine-3,16-diacetate. A description of the preparation of a 3,16-diester can be found in S. Morris Kupchan and C. R. Narazanon, ibid.

DESCRIPTION AND PREFERRED EMBODIMENTS

This invention provides a method of preparing the novel compound germine-3,15-diacetate and salts and hydrates thereof. This compound is represented by the following structural formula:

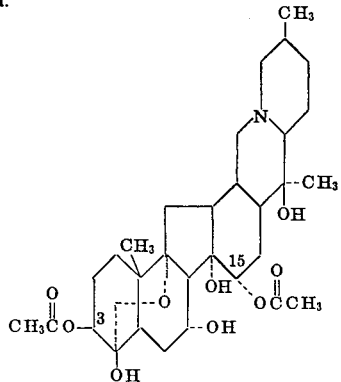

To practice the present invention, germine-3,16-diacetate is converted in good yield to germine-3,15-diacetate by intramolecular transesterification when germine-3,16-diacetate is dissolved in aqueous solution above pH 7.

Germine-3,15-diacetate can be prepared by dissolving germine-3,16-diacetate in an aqueous solution, the pH of which is greater than 7. A quantity of organic or inorganic base may be added to effect the desired pH, however this is not necessary to complete the reaction. Above pH 7, the intramolecular transesterification of the 16-acetoxy group to the 15-acetoxy group occurs. It is preferable to use reaction conditions where the pH of the medium is 7–10 since at pH greater than this further reaction may occur. Such bases that may be present are 2,6-lutidine, s-collidine, pyridine, ammonium hydroxide, an inorganic buffer having desired pH such as a phosphate buffer, etc.

The reaction must be carried out in the presence of water which enables the transesterification of the 16-ester to 15-ester group to proceed. At least a catalytic amount of water should be present in order to form the desired compound but higher quantities can be used. It is preferable to use about a 50 percent aqueous medium. It is most desirable to run the reaction in a ratio of water and solvent in which the germine-3,16-diacetate is appreciably soluble. The amount of water present could likewise be adjusted for the convenience of the reaction and to suit other reaction conditions such as temperature, time, pH, etc. If preferred, this reaction may further be carried out in an entirely aqueous medium, the pH of which would depend on the amount of germine-3,16-diacetate present.

The reaction may also be carried out in the presence of a solvent. It is best to use a solvent which is miscible with water since water is also necessary for the completion of the reaction. It is also preferable to choose a solvent in which the germine-3,16-diacetate is soluble. The solvent may likewise be the basic medium itself which is diluted with water (such as 50 percent aqueous pyridine or a phosphate buffer having a pH of about 8). Representative solvents which can be used alone or in combination include acetone, ethanol, methanol, pyridine, acetonitrile, dimethylsulfoxide, nitromethane, dimethylformamide, dimethoxyethane, etc.

The temperature of the reaction employed and the time necessary to carry out the reaction will depend on the various other reaction conditions present. It is preferred to carry out the reaction at a temperature between about 0°–40° C., and 20°–30 C. being most preferable. The reaction may be carried out from less than 1 hour to several weeks and still obtain germine-3,15-diacetate.

The separation and purification of germine-3,15-diacetate can be carried out by methods known in the art. It is preferred and convenient to accomplish this separation and purification of germine-3,15-diacetate by chromatographic techniques, one such system being a silica gel column using 5–95 percent ethanol in chloroform as the eluant. It is further convenient to follow the extent of the conversion of the reaction by ascending thin-layer chromatography using a mobile ethyl acetate-methanol-concentrated ammonia (80:15:5) eluant with silica gel plate.

Germine-3,15-diacetate may be readily converted to its non-toxic acid addition salts by customary methods in the art; such salts would include those prepared from hydrochloric acid, hydrobromic acid, sulfuric acid, nitric acid, phosphoric acid, methanesulfonic acid, acetic acid, propionic acid, oxalic acid, glycolic acid, lactic acid, salicylic acid, etc. It is possible to form a hydrate and separate this from the reaction mixture; thus, for example, germine-3,15-diacetate oxalate monohydrate may be prepared by titrating germine-3,15-diacetate with an aqueous solution of oxalic acid and isolating the desired hydrate by methods known in the art. These hydrates are included within the scope of this invention.

Germine-3,15-diacetate, its non-toxic salts, and the hydrates thereof, are effective in increasing the tension of skeletal muscle in response to motor nerve stimulation. The neuromuscular actions are similar to those obtained with other veratrum alkaloids, however it differs in that it lacks hypotensive and emetic properties common to the veratrum series.

Various tests in animals can be carried out to show the ability of germine-3,15-diacetate to exhibit reactions that can be associated with skeletal muscle effect in humans. One such test determines the tension responses of the gastrocnemius and soleus muscles to stimulation of the sciatic nerve in anesthetized cats. Data is expressed as the ratio of the twitch response to a single stimulus delivered at a frequency of 24 per minute to the maximum response to a 10-second tetanic stimulus delivered at a frequency of 50 cps. The responses are recorded following single dose administration. This test is outlined by Werner Flacke in the J. Pharm. and Exp. Ther., 141:230–236 (1963). In view of results from tests such as this, germine-3,15-diacetate can be expected to be effective in improving the skeletal-muscle power of patients with myasthenia.

Germine-3,15-diacetate and its pharmaceutically acceptable salts can be normally administered orally, parenterally or rectally. The term "parenteral" as used herein includes subcutaneous injection, intravenous, intramuscular or intrasternal injection or infusion techniques.

Orally, they may be administered in tablets, capsules, suspensions or syrups, the optimum dosage depending, of course, on the particular compound being used and the severity of the condition being treated. In any specific case, the appropriate dosage selected will further depend on factors of the human patient which may influence response to the drug, for example, general health, age, weight, etc. Although the optimum quantity of germine-3,15-diacetate to be used in such manner would depend on the severity of the condition treated, oral dose levels in the range of 0.25–300 mg./kg. (preferably in the range of 2–60 mg./kg. per day) show excellent effectiveness. Comparative dosages may be used in parenteral or rectal administration.

Compositions may be prepared according to any method known to the art for the manufacture of pharmaceutical compositions and such compositions may contain one or more agents; for example, sweetening agents, flavoring agents, coloring agents, preserving agents, etc. Further, germine-3,15-diacetate or its salts may be administered alone or in admixture with other active ingredients such as anticholinesterase agents and/or non-toxic pharmaceutically acceptable excipients. Such excipients may be, for example, inert diluents such as calcium carbonate and lactose; granulating and disintegrating agents, for example, corn starch and alginic acid; lubricating agents, for example, magnesium stearate and talc; binding agents, for example, starch and gelatin; suspending agents, for example, methylcellulose and vegetable oil; dispersing agents, for example, lecithin; thickening agents, for example, beeswax and hard paraffin; emulsifying agents, for example, naturally-occurring gums; and non-irritating excipients, for example, cocoa butter and polyethylene glycols. Although the unit dosage of germine-3,15-diacetate to be used would depend on factors of the patient, unit dosages containing between about 1–100 mg. are considered to be useful.

The following examples show the preparation of germine-3,15-diacetate and are to be construed as illustrations of this invention and not as limitations thereof.

A solution of 10 g. of germine-3,16-diacetate in 200 ml. of 50 percent aqueous pyridine is allowed to stand at room temperature for three weeks. After addition of 50 ml. of concentrated ammonium hydroxide it is extracted with three 100 ml. portions of chloroform, dried over magnesium sulfate, filtered, concentrated at reduced pressure and dried at 100° in vacuo to afford 8.1 g. of amorphous yellowish solid. Dry-column chromatography (1 g. of mixture to 200 g. of silica gel) using 10 percent ethanol in chloroform as eluant is used to obtain the free base of germine-3,15-diacetate as an amorphous solid.

The above reaction, when carried out for 1 hour in a methanol-water solution (1:1 by volume) and adjusting the pH to 9.5 with 0.1 M aqueous ammonium results in germine-3,15-diacetate.

Germine-3,15-diacetate is titrated in methanol with an oxalic acid solution to pH 5. After removal of the methanol, the residue is recrystallized from acetonitrile-ether to afford germine-3,15-diacetate oxalate monohydrate (m.p 214°–216°, dec.). Anal. calcd. for $C_{33}H_{51}NO_{15}$ (mol. wt. 701.77)

C, 56.48; H, 7.33; N, 2.00.
Found:
C, 56.49; H, 7.21; N, 1.86.

Representative composition preparations are as follows:

A solution of 200 mg. (0.34 mmoles) of germine-3,15-diacetate in 100 ml. of water is prepared and 23 mg. of anhydrous citric acid (0.12 mmoles) is added to this with stirring. This is then divided into 10 ml. aliquots, each containing 20 mg. of germine-3,15-diacetate for use in injectables.

Capsules for oral use, each containing 50 mg. of germine-3,15-diacetate are prepared by blending 50 g. of germine-3,15-diacetate with 237 g. of lactose U.S.P. and 4.10 g. of magnesium stearate. This is then used to fill 1,000 capsules each containing 50 mg. of germine-3,15-diacetate.

What is claimed is:

1. A method for producing improvement in skeletal-muscle power of patients with myasthenia by the administration to the afflicted patient of an effective amount of germine-3,15-diacetate, a non-toxic pharmaceutically acceptable salt, thereof or the hydrate thereof.

2. A pharmaceutical composition for the treatment of myasthenia gravis which comprises as active ingredient 1–100 mg. of germine-3,15-diacetate, a non-toxic pharmaceutically acceptable salt, thereof or the hydrate thereof.

* * * * *